Patented Feb. 26, 1935

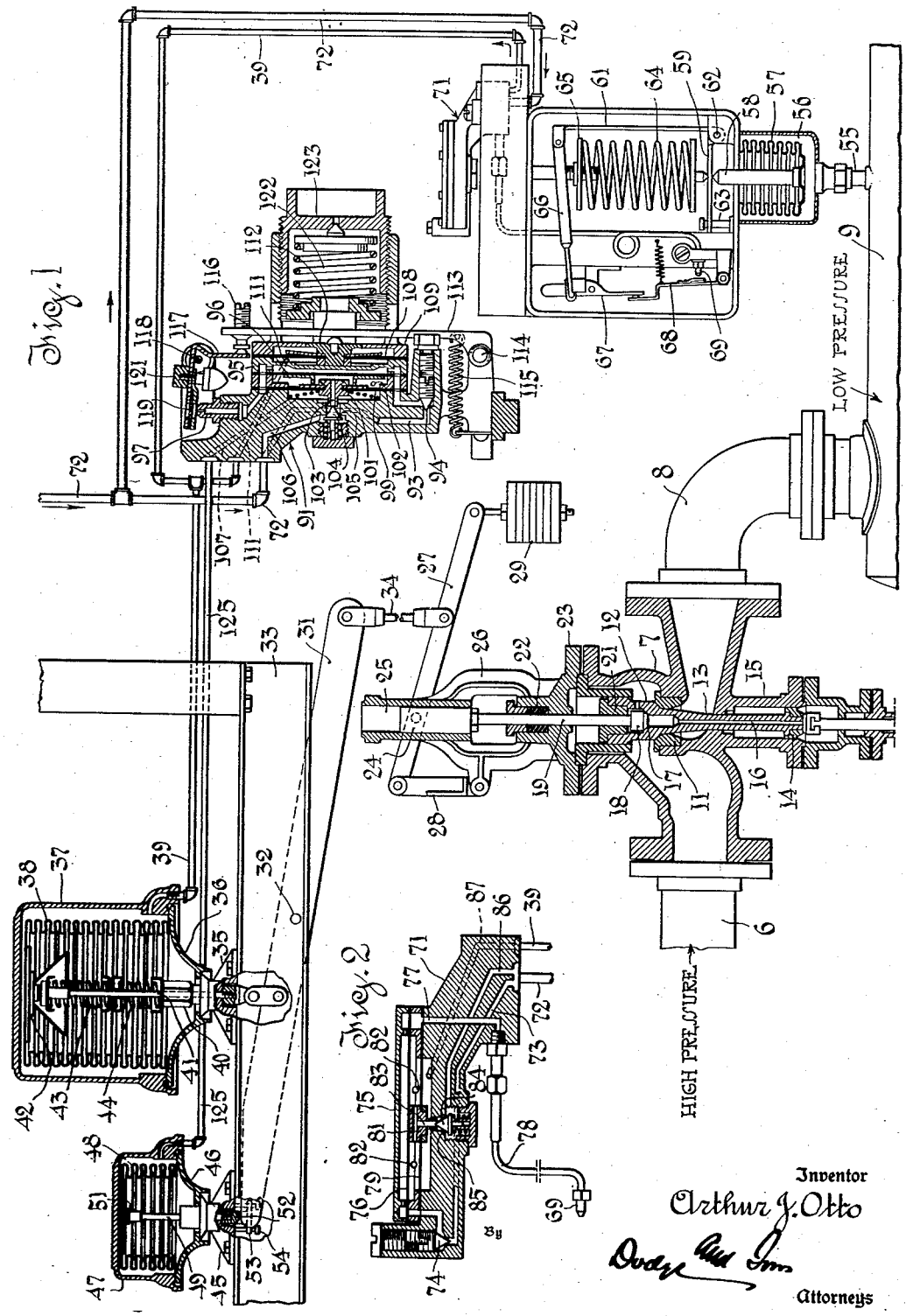

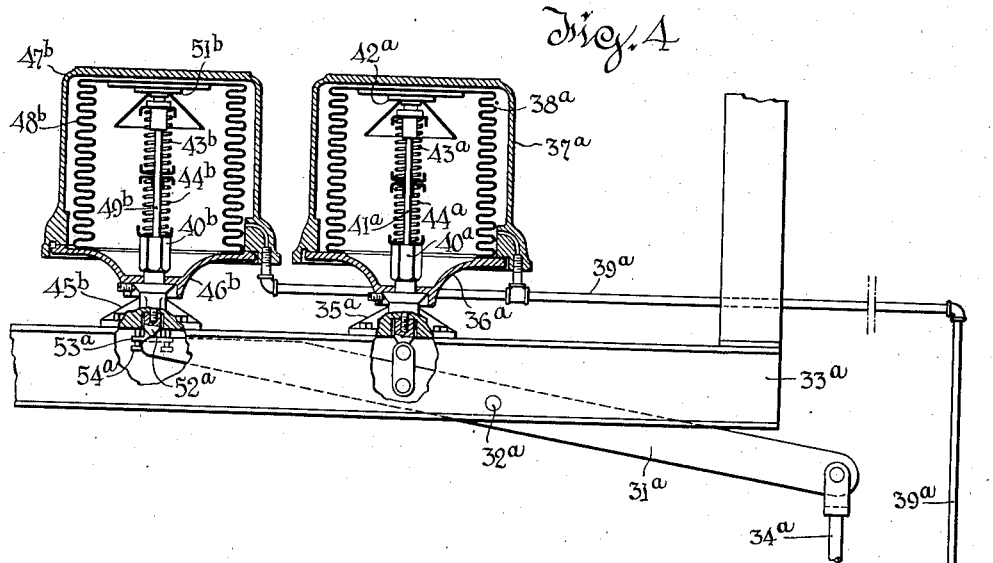
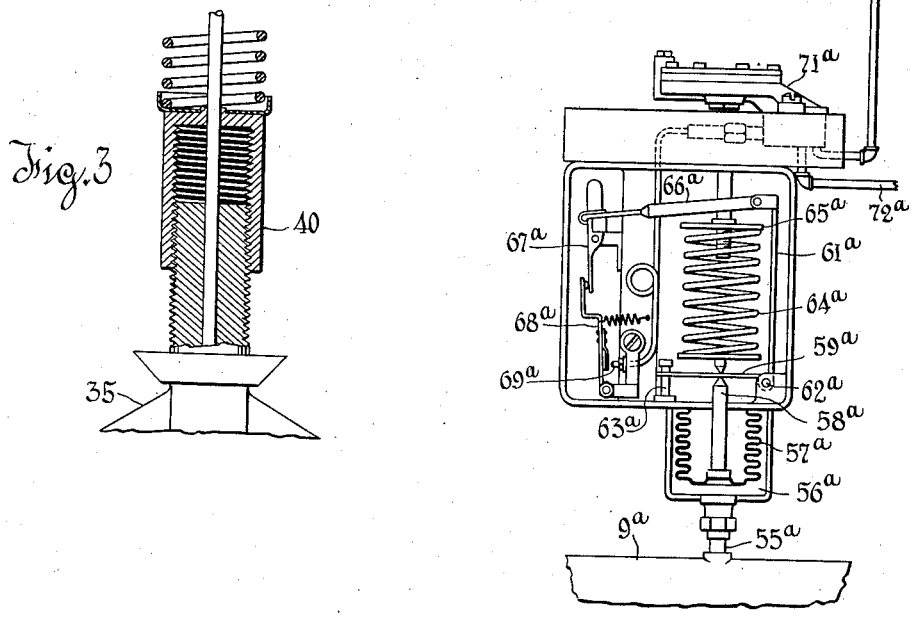

1,992,881

UNITED STATES PATENT OFFICE 1,992,881

PRESSURE REGULATION

Arthur J. Otto, Milwaukee, Wis., assignor to Johnson Service Company, Milwaukee, Wis., a corporation of Wisconsin Application March 12, 1934, Serial No. 715,206

15 Claims. (Cl. 50—10)

This invention relates to pressure regulation and particularly to pressure reducing valves characterized by the fact that throughout their normal operative range they are substantially balanced and hence move quite freely, while in their closed or substantially closed condition they are unbalanced, and hence require the exercise of considerable force to bring about their initial motion in an opening direction.

As typical of valves of this class may be mentioned valves of the poppet type including balancing means controlled by a small but unbalanced pilot valve, the pilot valve having a definite seating tendency. These valves are peculiarly desirable because they combine the characteristics of free motion while flow occurs with the highly useful characteristic of a definite seating tendency when closed.

One characteristic of the invention is the use of two motor means, which may be described as the main actuating motor and a secondary or booster motor. The main motor operates to shift the pressure-reducing valve throughout its operative range, and the booster motor functions merely to carry the load of producing the initial opening movement of the valve and is thereafter inactive. The simplest way to accomplish this is to limit the motion of the booster motor to a very small range, and so arrange it that it is in th 1st relation with the valve-actuating means when the valve is completely closed.

Another feature of the invention is the control of the secondary or booster motor in response to the condition of energization of the main motor. When the main motor is completely inert the booster motor is inert. When the main motor is energized slightly the booster motor is completely energized so that it goes through its complete operative cycle, preferably before the main motor is energized sufficiently to shift the valve at all. As a result of such an arrangement the main motor operates to actuate the valve under uniform conditions of balance and can therefore function precisely.

Further details of the invention involve the use of a pneumatic relay operated in response to pressures created by flow through the pressure-reducing valve to establish a variable pressure in the main motor. In this way progressive regulation of the flow-controlling valve of a peculiarly smooth and reliable character may be had.

Another feature of the invention is the use of a pneumatic relay responsive to the pressure condition in the main motor to energize and de-energize the secondary motor. By using a relay of a type which will respond to a relatively small pressure in the main motor to establish a relatively high pressure in the secondary motor, it becomes possible to determine the energization of the secondary motor merely by de-energizing or slightly energizing the main motor. The pressure in the secondary motor is sufficient to force the secondary motor through its entire operative range before sufficient pressure is established in the main motor to shift the valve at all. Since the motion of the secondary motor establishes a balanced condition of the valve, the main motor becomes operative upon a completely balanced valve, and actuates that valve smoothly through its entire regulative range.

The invention is susceptible of embodiment in a number of specifically different forms, two of which will be described. One shows the invention embodied by the use of pressure motors and relays extensively used in the temperature regulating art. The other shows the possibility of omitting one relay in certain cases.

In the accompanying drawings,—

Fig. 1 is a view partly in diagrammatic elevation and partly in section, showing the essential elements of the device. The flow regulating valve is shown in closed condition.

Fig. 2 is an axial section through one of the fluid pressure relays.

Fig. 3 is a detail section of the adjusting means for the motor springs.

Fig. 4 is a fragmentary view similar to Fig. 1, showing a modification.

The invention has been successfully used for the purpose of supplying low pressure steam from a high pressure main to a low pressure receiver or other receptacle. The invention may be used in conjunction with apparatus for de-superheating steam in the low pressure receiver, but since the de-superheating apparatus functions independently of the pressure reducing apparatus, and is not essential to the operation of the pressure reducing valve mechanism, it is not illustrated. It should be expressly understood, however, that there is nothing in the construction or operative characteristics of the pressure reducing mechanism which would preclude the use of such a de-superheating mechanism if desired. Furthermore, the invention is in nowise limited to reduction of pressure of steam, as it might be used with any fluid, particularly expansible fluids.

While compressed air will be referred to in the description as the motive fluid used in the main and secondary motors, other suitable pressure fluids may be substituted as occasion may demand.

Refer first to Figs. 1 and 2.

In the drawings, 6 represents a high pressure main here assumed to be a steam main and 7 represents the body of a pressure-reducing valve. This valve is illustrated as typical and no novelty is here claimed for the specific construction of the valve. The body 7 is connected to an elbow 8 which conducts the steam at reduced pressure to a low pressure container or receiver 9. The body 7 of the valve is provided with a seat 11 for a valve element 12 of the poppet type. The valve element 12 has a pilot and flow-controlling element 13 which is of tapered form, and which terminates at its lower end in a balancing head or piston 14 working in a cylindrical chamber formed as an extension of the valve body 7. The space within cylinder 15 above the piston head 14 is in communication with the discharge (low pressure side) of the valve around the pilot 13. The space below the piston 14 is connected by way of the small axial passage 16 with the seat 17 of an unbalanced pilot valve 18 of the poppet type.

The valve 18 is of much smaller area than the flow-controlling valve 12 but nevertheless, when closed, is subjected to substantial seating pressure. The opening of the valve 18 subjects the space below the piston 14 to supply pressure arriving through the high pressure connection 6, but since the effective area of the piston 14 is made equal to the effective area of the valve 12, the opening of the valve 18 places the valve 12 in a condition of static balance. Valve 18 has a stem 19 which works in a collar 21 fixed in the upper end of valve 12. The parts are so arranged that when the stem 19 is drawn up it first unseats valve 18 to balance valve 12, and then enters into thrust engagement with collar 21 and serves as a connecting means for controlling the opening and closing movements of the valve 12.

The stem 19 passes through a stuffing box 22 in the valve bonnet 23 and terminates in a cross head 24 guided in a guide passage 25. This is supported by a yoke 26 carried by the bonnet. A lever 27 pivoted to cross head 24 and to a radius link 28 which in turn is pivoted to yoke 26, offers means for actuating stem 19 and consequently both the pilot valve 18 and the main flow-controlling valve 12. A determinate closing tendency is imparted to the valve structure by means of weights 29 hung on the outer end of the lever 27.

A lever 31 pivoted at 32 to any suitable fixed support 33 is connected by a link 34 with the lever 27. Mounted on support 33 is a base 35 for the main valve-actuating motor which will be recognized as structurally similar to motors used for actuating steam valves and dampers in the temperature regulating art. This motor includes a base-plate 36 angularly adjustable on a vertical axis with reference to base 35, a cup-shaped cap 37, and metallic bellows 38 enclosed within the cap 37 closed at their upper end and sealed at their lower end to the member 36.

The motive pressure for actuating this motor arrives by way of the pipe connection 39, and the pressure acts in the space between the bellows 38 and the cap 37 so that upon rise of pressure the moving element of the motor is forced downward. This moving element comprises a stem 41 having a head 42 in thrust engagement with a horizontal wall at the upper end of bellows 38. The stem 41 is guided in the base 35 and is urged upward by a compression spring structure here indicated as composed of two alined compression springs 43 and 44 which encircle the stem 41 and react between the head 42 and a spring seat 40 threaded on the upper end of base 35 (see Fig. 3).

It is important to observe at this point that if the springs 43 and 44 are under moderate compression when the motor is inert the stem 41 will not start downward motion until a definite and determinate pressure is established in the motor. The adjustable seat 40 permits this initial stress to be adjusted.

The secondary or booster motor is supported by a base 45 on the support 33, and is similar in construction to the main motor though of shorter stroke. The essential elements are the disk 46, cap 47, metallic bellows 48 closed at their upper end, and the push rod 49 with thrust head 51. No spring is required in conjunction with this motor, and consequently none is shown. However, a light spring could be used. The push rod 49 of the motor terminates at its lower end in a beveled thrust plunger 52 which engages the lever 31 near its end, and which is limited in its downward motion by a stop-plate 53 which may be adjusted by means of the screws 54. The adjustment is such that the push rod 49 can move downward only the short distance necessary to swing lever 31 far enough to unseat the pilot valve 18.

It will be observed that lever 31 is not connected with the thrust head 52 so that it may turn independently of any motion of the secondary motor. From this fact it follows that as soon as the pilot valve has been opened sufficiently to balance the main valve, the entire control of the main valve is taken over by the main motor.

Any suitable means responsive to pressure in the low pressure receiver 9 might be used to establish a variable operating pressure in the main motor, but in the present case the use of a modified form of the relay device shown in the Otto and Otto patent, No. 1,500,260 dated July 18, 1924 is illustrated.

The patent above identified shows a relay which produces progressively variable pressure in a branch pipe in response to progressive variations in temperature. The thermally responsive element controls a leak port. In the present device the leak port is controlled by a valve responsive to variations in pressure in the receiver 9.

Referring to Fig. 1, a connection 55 leads from the receiver 9 to the chamber 56 in which is mounted a metallic bellows 57 closed at its lower end. A thrust rod 58 is connected to the closed movable end of the bellows and reacts against one arm 59 of a bell-crank whose other arm is indicated at 61. This bell-crank is pivoted at 62 and has its range of motion fixed by adjustable stop 63.

The fluid pressure acting on the bellows 57 is resisted by a coiled compression spring 64 which reacts between the arm 59 of the bell-crank and an adjustable spring seat 65. The upper end of arm 61 of the bell-crank is connected by a link 66 with a rocking lever 67 which is in thrust engagement with the valve member 68, sometimes called a lid, for a leak port 69.

It would perhaps suffice to say that the leak port 69 and the lid 68 just described correspond to the leak port 30 and valve 31 of the Otto patent, and control a relay generally indicated in Fig. 1 of the present application by the reference numeral 71, such relay conforming to the structure of the Otto patent. However, in the interest of clearness the structure of the relay 71 will be briefly described with reference to Fig. 2.

In said figure the leak port 69 is identified, and the numeral 71 indicates the ported body of the device. A supply pipe 72 conducts fluid under pressure, ordinarily compressed air, to the device. It passes through two distinct paths. First, the port 73 which leads past the throttling needle valve 74 to the space between the cover 75 and a flexible diaphragm 76. This space is connected by a port 77 and pipe 78 with the leak port 69. The capacity of the leak port slightly exceeds the flow capacity past the throttling needle valve 74 so that variable throttling of the leak port 69 will establish a variable control pressure in the space above the diaphragm 76. A second and smaller diaphragm 79 carries at its center a hub member 81 which is in thrust relation with diaphragm 76 for the reason that the space between the two diaphragms is vented to atmosphere at 82. An exhaust port leads axially through the hub 81 and then laterally to the space between the two diaphragms. This port is indicated generally by the numeral 83 and its lower end serves as the exhaust seat for a combined admission and exhaust valve 84. The valve 84 also has a supply seat at 85, the seat being formed in the body 71. A branch passage 86 leads from supply connection 72 to this valve.

When the leak port 69 is throttled the rising pressure on the upper or outer side of the diaphragm 76 forces both diaphragms downward, the valve 84 seats in the exhaust port in the hub and closes the same, continued motion of the hub forces valve 84 away from the supply seat 85 admitting pressure fluid through the passage 86 until sufficient pressure is built up on the smaller diaphragm 79 to balance the pressure acting inward on diaphragm 76. At such time the valve 84 seals against both the seats above described. The throttling of the port 69 therefore establishes in the space beneath diaphragm 79 a variable pressure which is connected by way of port 87 and pipe 39 (see Fig. 1) to the main pressure motor.

From the above description it will be obvious that as pressure in the receiver 9 rises the leak port 69 will be progressively opened. Consequently, the pressure in the branch line 39 will be progressively lowered, the plunger 41 of the main motor will move upward progressively, and the valve 12 will be progressively closed. Converse action takes place on fall of pressure in the receiver 9.

The apparatus so far described would operate the valve 12 satisfactorily throughout its entire operative range, but would not furnish the force necessary to unseat the valve 12 without first establishing in the main motor an unduly heavy pressure. The establishment of such a pressure would cause the governor to hunt badly. To overcome this defect, the secondary motor is connected so as to be fully energized as soon as a very slight pressure is developed in the main motor, preferably a pressure not quite sufficient to overcome the initial stress in the springs 43 and 44.

The means for energizing the secondary motor is another relay constructed according to the Otto patent above identified, and functionally very similar to the relay and pressure actuated valve already described. In appearance it is somewhat different because the pressure responsive element here responds to air pressure, and therefore can be closely associated with the relay structure, whereas the steam operated bellows 57 was necessarily isolated from the relay structure to avoid the harmful effects of heat.

This relay structure has a base 91 essentially similar to the base 71, and receives air under pressure through a branch of the supply pipe 72. This air flows through a port 93 past a throttling needle valve 94 to the space between a plate 95 and a diaphragm 96. The space between plate 95 and diaphragm 96 is vented by a leak port 97 at a rate which, when the leak port is fully opened, slightly exceeds the rate of flow past the throttling valve 94.

It will be observed that the parts so described conform closely in structure, and are identical in function, with the parts 71 to 77. To simplify the description it will suffice to apply reference numerals 99 to 107 to the parts corresponding functionally with the parts 79 to 87. In other words, similar parts in the two structures are similarly numbered, the differential between the numbers of the two series being twenty. There is no pipe corresponding to the pipe 78 of Fig. 2 for the reason that this connection is made through a port in the base 91.

The pressure responsive device corresponding to the bellows 57 is a diaphragm 108 clamped against the forward side of the plate 95 by a cover 109. The space in front of diaphragm 108 is vented to the atmosphere, the space to the rear of the diaphragm is connected by a port 111 with a branch of pipe 39, and consequently with the interior of the main motor space between cap 37 and bellows 38. Guided in the front plate 109 is a thrust member 112 which reacts against an arm 113 pivoted to base 91 at 114. This arm is drawn inward against the thrust member 112 by a coiled tension spring 115 and at its end carries a thrust screw 116 which bears on one arm of a bell-crank lever 117. This bell-crank lever is pivoted at 118 and carries a valve 119 co-acting with the leak port 97. A weight 121 intended to be typical of any yielding means, urges the bell-crank in a direction to seat valve 119 upon leak port 97 and thus close the leak port. A loading spring 122 having an adjustable threaded spring seat 123 resists outward motion of the thrust member 112, so that when the diaphragm 108 is forced outward and overpowers spring 122 it will swing lever 113 in a direction to permit valve 119 to close. The space to the rear of diaphragm 99 is connected by port 107 and connecting pipe 125 with the working space of the secondary motor, that is, the space between the cap 47 and the bellows 48.

While it is not material what pressures are used, it will simplify explanation to use definite pressures, and for that purpose the values which have been encountered in actual practice will be stated. With the understanding that the statement of pressures has no limiting significance, it is assumed that high pressure steam is delivered through the main 6 at 200 pounds gage, and that the pressure to be maintained in the receiver 9 is 140 pounds. So far as this invention is concerned it is immaterial whether the steam in the drum is or is not de-superheated by other means. The possibility of using other apparatus so far as the present invention is concerned is expressly stated.

It will be assumed that, in accordance with the usual practice, compressed air is supplied to pipe 72 at a pressure of approximately 15 pounds gage. The relay indicated generally by the numeral 71 is therefore capable of establishing in the main motor a pressure which varies between atmospheric pressure and 15 pounds gage. The strength of the springs 43 and 44, and the lever ratios between the motor and the stem 19 must be so chosen that with a pressure variation of this range in the main motor, the valve stem 19 will be moved through its entire operative range. The bellows 57 are of such area, and the effective stress of the opposing spring 64 is such, that within the governing range of pressures in the receiver 9 the bellows 57 will move the leak port 68 through its operative range and thus cause the relay 71 to respond through its operative range.

The stress on the spring 122 and the area of the diaphragm 108 are so chosen that a variation of pressure in the pipe 39 and consequently in the main motor between atmospheric pressure and a few ounces per square inch gage, will cause the relay mounted on base 91 to move through its entire range. From this it follows that when the main motor is at atmospheric the secondary motor will be at atmospheric pressure, and when the main motor is subjected to a pressure of a few ounces per square inch gage, the secondary motor will be subject to a pressure of 15 pounds gage, the maximum pressure available in the pneumatic system.

Assuming that the pressure in the receiver 9 is so high that the valve 12 is completely closed and the pilot valve 18 is closed, under such condition the bellows 57 must have moved the leak valve 68 sufficiently to open leak port 69 completely, thus venting the pressure on the diaphragm 76 faster than it can be built up by the supply of pressure fluid past the needle valve 74. Under these conditions pressure in the line 39 will be vented and the pressure on the bellows motor 38 will be substantially atmospheric. Similarly, the relay structure mounted in base 91 will function to establish a substantially atmospheric pressure on the secondary motor bellows 48. The closing of valve 12 will result ultimately in a decrease of pressure in the receiver 9 so that the spring 64 will partially overpower bellows 57. This will move valve 68 to throttle partially the outflow through the leak port 69, the pressure acting on the upper or front face of the diaphragm 76 will rise, the diaphragms 76 and 79 will move downward (inward), and through co-action with the combined inlet and exhaust valve 84 will establish a balancing or related pressure on the rear face of diaphragm 79. This pressure is communicated through the port 87 and pipe 39 to the working space above bellows 38 in the main motor. Initially this pressure may not be sufficient to overpower the stress in springs 43, 44, but since the pipe 39 is also connected to the space at the rear of diaphragm 108, this diaphragm will be forced outward against the resistance of spring 122.

As explained, the parts are so adjusted that the resulting motion of valve 119 in a direction to throttle port 97 will establish practically the full available pneumatic pressure in the pipe 125, and consequently in the working space above the bellows 48 of the secondary motor. This motor immediately moves through its complete operative range, and in so doing shifts lever 31 just far enough to unseat the pilot valve 18 and put the main flow-controlling valve 12 in a balanced condition. The apparatus is now conditioned for a smooth progressive control in response to variations of pressure in the working space above the bellows 38.

It will be obvious that the secondary motor will not permit the pilot valve 18 to close until the pressure acting on the main motor bellows 38 falls to such a low value that the valve 12 is closed. Preferably, the secondary motor allows the pilot valve to close as nearly simultaneously with the closure of valve 12 as is practically possible. The closing of the pilot valve throws the main valve out of balance and ensures a definite seating pressure on the main pilot valve which will prevent injury to the valve resulting from leakage or wire drawing.

A simplified embodiment doing away with the second relay and using a more powerful secondary motor is illustrated in Fig. 4. In this figure the parts identical with parts in Fig. 1 are given similar numbers with the subscript $a$. The parts in Fig. 1 which are identical in Fig. 4 are those numbered 6 to 44 and 52 to 87 both inclusive. The structure of Fig. 4 contains no parts analogous to the parts numbered 91 to 125 both inclusive.

Instead of the small auxiliary motor used in Fig. 1, a large motor comparable in size with the main motor is used. It can be of any necessary size. Thus instead of the parts 45—51, there is a motor base $45_b$ carrying disc $46_b$, cap $47_b$, bellows $48_b$, closed at their upper end, and push rod $49_b$ with thrust head $51_b$. Springs $43_b$ and $44_b$ are used and are adjustable by spring seat $40_b$ similar to the parts $40_a$, $43_a$ and $44_a$. The line $39_a$ is connected directly with both motor housings $37_a$ and $47_b$ instead of being connected with the main motor housing and the second relay.

The springs $43_a$, $44_a$ are more heavily stressed initially than the springs $43_b$, $44_b$, so that when both motors are subjected to a given pressure the diaphragm $48_b$ responds through the limited range permitted it substantially when diaphragm $38_a$ neutralizes the stress of springs $43_a$, $43_b$. Thus as before, the auxiliary motor shifts the pilot valve, puts the main valve in balance and relinquishes control to the main motor.

The modified structure is simpler, but is less sensitive and somewhat slower in action. The secondary relay when used saves air, speeds up response and causes the secondary motor to respond to a very low pressure established by the first relay.

The specific mechanism disclosed in Figs. 1 and 2 of this application has been used successfully and is preferred for commercial reasons, but the fact is recognized that broad operative principles are involved, and that the invention is not limited necessarily to the use of the relay structures illustrated, or even to the use of relay structures at all. In regulating the valve 12 in response to pressures in the low pressure receiver 9 the first essential, according to the invention, is a motor which will actuate the valve progressively through its operative range in response to variations in the pressure to be maintained, in conjunction with some motor means inert when the main motor is inert and rendered active through a limited range upon the initial energization of the main motor to assume the load of the initial opening movement of the valve. Various arrangements, in addition to the modification illustrated, will accomplish this result and fall within the intended broad scope of the present invention.

What is claimed is,—

1. The combination of a flow-regulating valve freely movable through its operative range but offering greater resistance to initial motion from closed condition; a main motor for shifting said valve through its operative range; a secondary motor capable of dissipating said greater resistance without affecting the motion of the valve through its operative range; means responsive to pressures created by flow through said valve and serving variably to energize said main motor; and means responsive to energization and de-energization of the main motor and serving to energize and de-energize the secondary motor.

2. The combination defined in claim 1, in which both motors are of the fluid pressure operated type, and the means responsive to energization and de-energization of the main motor is a sensitive pressure-multiplying relay valve mechanism.

3. The combination defined in claim 1, in which the secondary motor acts to dissipate said greater resistance by actuating a pilot valve which functions to put the flow-regulating valve in a balanced condition when open and in an unbalanced condition when closed.

4. The combination of a flow-regulating valve freely movable through its operative range but offering resistance to initial motion from closed condition; a booster motor arranged to force said valve from closed condition without affecting the motion of the valve through the remainder of its range; a main motor for shifting the valve through its operative range; pressure responsive means subject to pressures created by flow through said valve and serving variably to energize said main motor; and means responsive to energization and de-energization of the main motor and serving to energize and de-energize the booster motor.

5. The combination defined in claim 4, in which both motors are of the fluid pressure operated type, and the means responsive to energization and de-energization of the main motor is a sensitive pressure-multiplying relay valve mechanism.

6. The combination of a flow controlling valve having a substantially uniform resistance to motion through its operative range and a greater resistance to motion at one limit of its range; a main motor connected to shift said valve progressively in response to variations of a motive-fluid pressure; means responsive to pressures created by flow through said valve and arranged to establish related motive-fluid pressures in said motor; a secondary motor capable of dissipating said greater resistance; and means subject to pressure in said main motor and responsive to conditions therein at the time of such greater resistance, to render the secondary motor active.

7. The combination defined in claim 6, in which the secondary motor is of the fluid pressure operated type and the means subject to pressure in said main motor comprises a sensitive pressure-multiplying relay controlling the pressure in such secondary motor.

8. The combination of a flow-regulating valve of a type substantially balanced through its operative range but having a substantial resistance to initial opening motion; a main pressure motor connected to actuate said valve and responsive to variable fluid pressure to shift said valve through its operative range; a booster pressure motor arranged to assist said main motor only through the range of substantial resistance to valve-opening; pressure responsive valve means subject to pressures created by flow through said flow-regulating valve and arranged to establish related fluid pressures in said main motor; and a fluid pressure relay responsive to pressure in said main motor and serving to vent said booster motor when the main motor is vented and in response to low pressure in the main motor to establish a pressure in the booster motor sufficient to overcome said initial resistance.

9. The combination of a flow-regulating valve of a type substantially balanced through its operative range, such balance being established in the closed condition of the valve by the shifting of a pilot valve against substantial resistance; a main pressure motor connected to actuate the flow-controlling valve and responsive to variable fluid pressure to shift such valve through its operative range; a second pressure motor connected to open said pilot valve when the second motor is subjected to pressure; pressure responsive means subject to pressures created by flow through the flow-regulating valve and arranged to establish related fluid pressures in the main pressure motor; and a fluid pressure relay responsive to pressure in said main motor and serving to vent the second motor when the main motor is vented, and in response to low pressure in the main motor to establish a pressure in the second motor sufficient to open said pilot valve.

10. The combination of a flow-regulating valve of a type substantially balanced through its operative range but having a substantial resistance to initial opening motion; a main pressure motor connected to actuate said valve and responsive to variable fluid pressure to shift said valve through its operative range; a booster pressure motor arranged to assist said main motor only through the range of substantial resistance to valve-opening; pressure responsive valve means subject to pressures created by flow through said flow-regulating valve and arranged to establish related fluid pressures in said main motor and booster motor; and means for causing said motors to operate serially.

11. The combination of a flow-regulating valve of a type substantially balanced through its operative range but having a substantial resistance to initial opening motion; a main pressure motor connected to actuate said valve and responsive to variable fluid pressure to shift said valve through its operative range; a booster pressure motor arranged to assist said main motor only through the range of substantial resistance to valve-opening; pressure responsive valve means subject to pressures created by flow through said flow-regulating valve and arranged to establish related fluid pressures in said main motor and booster motor; and means comprising loading means for at least one of said motors, for causing said motors to operate serially.

12. The combination of a flow-regulating valve freely movable through its operative range but offering greater resistance to initial motion from closed condition; a main motor for shifting said valve through its operative range; a secondary motor capable of dissipating said greater resistance without affecting the motion of the valve through its operative range; means responsive to pressures created by flow through said valve and serving variably to energize said motors; and means for rendering said motors effective serially.

13. The combination of a flow-regulating valve freely movable through its operative range but offering greater resistance to initial motion from closed condition; a main motor for shifting said valve through its operative range; a secondary motor capable of dissipating said greater resistance without affecting the motion of the valve through its operative range; means responsive to pressures created by flow through said valve and serving variably to energize said motors; and means comprising a loading mechanism for the main motor, for causing said motors to become effective serially.

14. The combination of a flow-regulating valve freely movable through its operative range but offering resistance to initial motion from closed condition; a booster motor arranged to force said valve from closed condition without affecting the motion of the valve through the remainder of its range; a main motor for shifting the valve through its operative range; and pressure responsive means subject to pressures created by flow through said valve and serving to energize variably both motors.

15. The combination of a flow-regulating valve freely movable through its operative range but offering resistance to initial motion from closed condition; a booster motor arranged to force said valve from closed condition without affecting the motion of the valve through the remainder of its range; a main motor for shifting the valve through its operative range; pressure responsive means subject to pressures created by flow through said valve and serving to energize both motors; and means for causing said motors to respond serially.

ARTHUR J. OTTO.